United States Patent [19]

Bettenhausen

[11] Patent Number: 5,303,293
[45] Date of Patent: Apr. 12, 1994

[54] CRYPTOGRAPHIC DEVICE WITH A DISPLAY MEANS FOR IDENTIFICATION OF A DEFECTIVE FUNCTION IN THE CRYPTOGRAPHIC DEVICE

[75] Inventor: Helmut Bettenhausen, Cornberg Rockensuess, Fed. Rep. of Germany

[73] Assignee: Siemens Aktiengesellschaft, Munich, Fed. Rep. of Germany

[21] Appl. No.: 946,488

[22] PCT Filed: Jul. 3, 1991

[86] PCT No.: PCT/DE91/00550

§ 371 Date: Nov. 3, 1992

§ 102(e) Date: Nov. 3, 1992

[87] PCT Pub. No.: WO92/02086

PCT Pub. Date: Feb. 6, 1992

[30] Foreign Application Priority Data

Jul. 20, 1990 [DE] Fed. Rep. of Germany ....... 4023131

[51] Int. Cl.$^5$ .............................................. H04K 1/00
[52] U.S. Cl. ............................................ 380/2; 380/49
[58] Field of Search ................................... 380/2, 49

[56] References Cited

U.S. PATENT DOCUMENTS

| | | | |
|---|---|---|---|
| 4,451,916 | 5/1984 | Casper et al. | 380/2 |
| 4,645,871 | 2/1987 | Bremer et al. | 380/2 |
| 4,926,475 | 5/1990 | Spiotta et al. | 380/2 |
| 5,161,186 | 11/1992 | Dolev et al. | 380/2 |

FOREIGN PATENT DOCUMENTS

| | | |
|---|---|---|
| 2243069 | 3/1974 | Fed. Rep. of Germany . |
| 2607274 | 9/1976 | Fed. Rep. of Germany . |
| 3507236C2 | 2/1987 | Fed. Rep. of Germany . |
| 3325349C2 | 6/1988 | Fed. Rep. of Germany . |
| 3639851A1 | 6/1988 | Fed. Rep. of Germany . |
| 62-115941 | 5/1987 | Japan . |

OTHER PUBLICATIONS

"Data and Voice Encryption", Fujitsu Sci. Tech. J., 22, 4, Sep. 1986, pp. 331–342.

"Die Praktischi Fehlersuche An Geraten Mit Mikrocomputern", Rundfunktech Mitteilungen, vol. 26 (1982) May/Jun., No. 3, Norderstedt, Deutschland, pp. 121–132.

Primary Examiner—David C. Cain
Attorney, Agent, or Firm—Hill, Steadman & Simpson

[57] ABSTRACT

A cryptographic device for use with a data terminal in a data network contains here a transmission channel (S) and a reception channel (E) with associated cryptogenerators and data input and output equipment, as well as a control device (C) for controlling the reception and transmission channels. Associated with the control device (C) is an internal monitoring device (UA) for independent monitoring of the cryptographic device functions, with a display means (A) being linked to the monitoring device UA), which display means is used to identify a defective function in the cryptographic device by alphanumeric representation of information about the defective function.

6 Claims, 1 Drawing Sheet

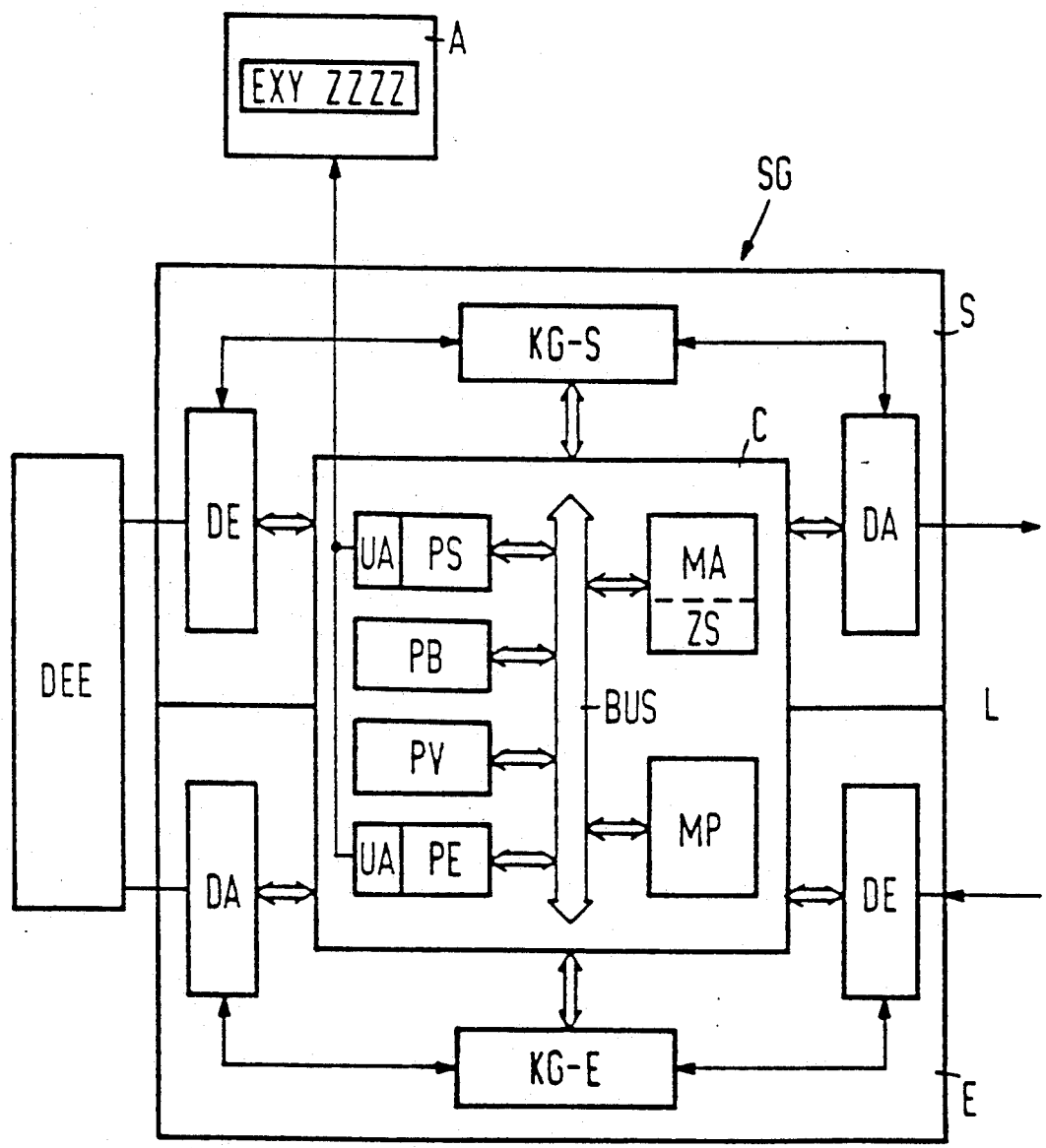

CRYPTOGRAPHIC DEVICE WITH A DISPLAY MEANS FOR IDENTIFICATION OF A DEFECTIVE FUNCTION IN THE CRYPTOGRAPHIC DEVICE

FIELD OF THE INVENTION

The present invention relates to a cryptographic device with a display means for identification of a defective function in the cryptographic device.

BACKGROUND

Cryptographic devices for use with a data terminal in a data network are very sensitive devices with respect to operational reliability. Function errors occurring in the cryptographic device directly affect data transmission in the network. This can lead to a transmission of data with corrupted information, which in some circumstances cannot be immediately detected by the network subscribers. It is therefore necessary to display a malfunction in the cryptographic device immediately.

By the very nature of their function, the design of cryptographic devices is very complex and they cannot be exchanged arbitrarily for reasons of security and cost. It is therefore necessary to detect and to identify immediately any function errors occurring, and to rectify these errors.

It is therefore the object of the invention to design a cryptographic device of the type mentioned at the beginning in such a way that function errors occurring in the cryptographic device can be reliably detected and identified.

SUMMARY OF THE INVENTION

The above object is achieved in a cryptographic device of the mentioned above, in which there is provided an internal monitor device for monitoring the functions of the cryptographic device, and a display device operatively connected to the monitoring device.

By virtue of the fact that the control device for the cryptographic device is assigned an internal monitoring device for independent function monitoring of the cryptographic device, to which monitoring device a display means for identification of a defective function in the cryptographic device by alphanumeric representation is linked, function errors occurring can be reliably detected and identified.

The function checking of the cryptographic device is carried out continuously during operation by the monitoring functions assigned to the monitoring device, the monitoring functions being advantageously hierarchically structured with respect to one another. The structure depends on the significance and on the effect of the function errors that can occur. In general, when an error occurs the control device of the cryptographic device and consequently the cryptographic device itself assumes an error status, and as a result the data transmission is immediately and recognizably interrupted. The malfunction occurring is indicated alphanumerically on an optical display means so that it can be identified immediately by reference to said display means. The display contains here information about the type of fault and the location of its occurrence within the control device or within a control program operating in the control device.

The functioning of the cryptographic device can be checked before data operation commences by means of a self-test routine, which can be triggered by input of "reset" for example. This produces a very high level of reliability for the operation of such a cryptographic device.

BRIEF SUMMARY OF THE DRAWINGS

An embodiment of the invention is illustrated in the drawing and is described in greater detail below by way of example.

The figure shows a diagrammatic block circuit diagram of a cryptographic device with integrated monitoring device and an optical display means.

DESCRIPTION OF THE PREFERRED EMBODIMENT

An error-protected telegraph network illustrated in the figure contains a multiplicity of data terminals DEE in the form of teleprinters or personal computers; for the sake of simplicity, however, only one data terminal DEE is illustrated in the drawing. Each data terminal DEE is assigned a cryptographic device SG, with a transmission cryptogenerator KG-S in a transmission channel S and a reception cryptogenerator KG-E in a reception channel E. The cryptographic devices SG of the various data terminals have the same design as one another. In the case illustrated, the telegraph network is operated in the "half-duplex" traffic mode, that is to say there is a transmission path in the form of a single line L, or a single transmission channel in the case of radio operation, between the data terminals. Telegraph signals are transmitted over the lines in the customary manner in five-unit or eight-unit codes with a preceding start element and a following stop element with five or eight information bits respectively. The cryptographic device illustrated is however also suitable for operation in other data networks.

Data input and data output circuits DE, DA which have commercially available receiving and transmitting modules, for example UART (universal asynchronous transmitter receiver), with associated shift registers (not illustrated here) are assigned both to the transmission cryptogenerator KG-S and to the reception cryptogenerator KG-E on the input and output sides. The shift registers serve as buffers for temporarily storing the information bits (5 or 8) of the telegraph signals supplied by the UART and sending them to the cryptogenerators for encryption or decryption. The encrypted or decrypted information bits are temporarily stored in the data output circuit DA and made available for transfer to the data terminal or for transmission over the line L. The data flow in the cryptographic device both in the transmission and in the reception channel is controlled by a control device C which is microprocessor-controlled. It contains four processors PS, PB, PV and PE which are connected to a main memory system MA and a program memory system MP via a bus system BUS. In this arrangement the processor PS is assigned to the transmission channel, the processor PE is assigned to the reception channel, the processor PB is assigned to the operating panel functions and the processor PV is assigned to key management handling. Linked to the control device C, and in particular to the processors PS and PE contained therein, is a display means A in the form of an LCD display for alphanumeric representation of information about defective functions of the cryptographic device detected.

To detect any malfunctions occurring in the cryptographic device, the control device C contains a monitoring device UA which is designed as a program-controlled computer arrangement. The computing work for the monitoring device UA is handled here by the processors PS and PE of the reception and transmission channels. The computer program for the monitoring device is stored in one of the program memories MP. Parts of the memory MA serve as main memory. The control device can however also be formed by elements of other microprocessors, or a separate microprocessor can be provided for the control device itself. The control device UA independently monitors the functioning of the cryptographic device during operation and before operation commences, and causes all defective functions in the cryptographic device to be displayed via the display A. If a function is defective, it is ensured at the same time that the control device C and consequently the cryptographic device itself assumes an error status. As a result, data transmission in the data network is interrupted, to be specific until the error has been rectified.

As already described, the monitoring device UA is designed as a program-controlled computer arrangement, via which a multiplicity of monitoring functions hierarchically structured with respect to one another can be called up for monitoring the cryptographic device functions. The hierarchical structure of the monitoring function depends here on the significance and on the effects of the function errors of the cryptographic device that can be identified by means of said monitoring functions. The hierarchy of said monitoring function can therefore be adapted to different application areas of the cryptographic device if necessary. This can be accomplished by means of a simple change in the program.

If the monitoring device detects a malfunction, which defines the so-called "exception" case, then the malfunction is represented alphanumerically on the display means as "exception". The following may occur as "exceptions", that is to say malfunctions of a defined type:

exception arising from unexpected messages
exception arising from task tracing
exception arising from incorrect subroutine branches
exception arising from incorrect storage, and
exception indicated after a self-test.

The types of exception represented are the basic exception types required; however it is also readily possible to detect and display other types of exception with the monitoring device.

The described exception types are detected, identified and represented by means of the alphanumeric display means A with the aid of the program of the monitoring device stored in the program memory MP. Said display means A may also form part of the operating equipment at the data terminal DEE.

The exception case is represented by means of a data word, which is represented symbolically in the region of the display means A. The letter E symbolizes the marking of the data word as an exception, the letter X symbolizes the exception type, the letter Y symbolizes the location of the exception, that is to say the address in the program or the status or the event, and the letter Z symbolizes the number of the event. By reference to the alphanumeric characters represented, the user of the cryptographic device is then able to identify the defective function (exception) immediately, for example with the aid of an identification list.

The malfunctions leading to an exception are detected by the monitoring functions described below. Each monitoring function represents here a program part of the overall monitoring device.

The monitoring functions in detail:

A first monitoring function serves for task tracing. This involves a check as to whether the routine branched to as a result of an event corresponds to a routine assigned to the set status of the cryptographic device. For this purpose, the monitoring device contains a status memory ZS, which comprises a memory area of the main memory MA in the case illustrated. The current operating status of the cryptographic device is stored therein, for example in the form of a single-position or multi-position data word. These statuses may be, for example, the "basic status" of the cryptographic device, the "OK" status or the "crypto position".

Messages or events triggering a routine, for example as a result of data requests, as a result of an "interrupt" or caused by a key on the operating panel being pressed, now occur within the control device. A defined set of messages or events can occur within the control device or in its program. Each message is assigned a defined status of the device, or requires this defined status as a prerequisite. Said status assignment can be achieved, for example, by corresponding coding or by assignment in a memory.

The monitoring function serving for task tracing compares the operating status that is the prerequisite for the message with the actual current operating status of the cryptographic device. For this it obtains from the message the operating status that is the prerequisite for the message and it obtains the actual current operating status of the cryptographic device from the status memory ZS by calling up the stored data word.

If different statuses are detected, the monitoring function and hence the monitoring device causes the cryptographic device to assume an error status, and displays the error via the display means A.

A further monitoring function following the task tracing routine serves to detect so-called unexpected messages. It has a similar structure to the task tracing routine, the monitoring function triggering an "exception" when messages, which are provided in a status, are activated. Such unexpected messages may be, for example, messages triggered or activated by a malfunction of the operating panel of the data terminal DEE. The assignment between message and status can be stored, for example, in the status memory ZS in the form of a table. If a message which is not permitted for said respective status then occurs, then this is detected by comparing the message with the assignment table in the status memory via the monitoring routine for erroneous messages.

The cryptographic device also assumes the error status in the case of erroneous messages.

A further monitoring function serves to determine subroutines that have been incorrectly branched to during execution of the computer program controlling the control device. In this case, a code number is always assigned to each subroutine of the overall program. When the subroutine is called up with the aid of a call-up code, the code number assigned to the subroutine is also transferred along with it. The call-up code is then compared in the subroutine with the code number assigned to the subroutine, and if the codes differ the control device assumes an error status. This error is then displayed on the display means A. By virtue of this monitoring function for subroutines, it is possible to detect, for example, an erroneous storing as a result of an incorrect address.

As already described, the monitoring functions are structured hierarchically, to be precise depending on the significance and effect of the errors occurring. Thus, first a task tracing routine is called up and then the other monitoring routines. The reason for this is that a branch is made into subroutines at "interrupt", and only then is the information checked. If, therefore, the branch destination is already incorrect, it is no longer necessary to check the information itself.

A further monitoring routine (monitoring function) serves for checking the functioning of the memory within the control device C. Said monitoring routine is called up by entering "reset" via the data terminal DEE. After "reset" has been called, a function test for the memories MA and MP (main memory and program memory) is automatically executed.

The program memory is tested here by polynomial formation of checksums and comparing the checksums formed with previously stored checksums. A function test of the main memory is performed by reading specific test bits into the main memory, which may be designed as RAM memory, and reading them out again. Here, too, a malfunction is represented on the display means A and the cryptographic device assumes the error status if appropriate.

In the exemplary embodiment of the control device C illustrated, the transmission processor PS functions as a master controlling the other processors via the data bus. If a malfunction that triggers an "exception" occurs, therefore, then the transmission processor PS sends a corresponding message to the reception processor PE. The reception processor acknowledges reception and the transmission processor PS thereupon interrupts the connection via the line L. The malfunction triggering the interrupt is represented on the display means A. It is apparent that various modifications and additions may be made in the apparatus of the present invention, without departing from the essential features of novelty thereof, which are intended to be defined and secured by the appended claims.

What is claimed is:

1. A unitary cryptographic device for use with a data terminal (DEE) in a data network, having
   a transmission channel (S) with associated transmission cryptogrnerator (KG-S) for encoding transmitted data and corresponding data input and output equipment (DE,DA),
   a reception channel (E) with associated reception cryptogenerator (KG-E) and corresponding data input and output equipment (DE, DA),
   a control device (C) for controlling the reception and transmission channels (S, E),
   an internal monitoring device (UA) assigned to the control device (C) for independent monitoring of the cryptographic device functions, and
   a display means (A) linked to the monitoring device (UA) for identification of a defective function in the cryptographic device by alphanumeric representation of information about the defective function.

2. A cryptographic device as claimed in claim 1, characterized in that the monitoring device (UA) is designed as a program-controlled computer arrangement, via which a multiplicity of monitoring functions hierarchically structured with respect to one another can be called up for monitoring the cryptographic device functions.

3. A cryptographic device as claimed in claim 2, characterized in that the monitoring device (UA) is assigned a status memory (ZS) for storing the current operating status of the cryptographic device, and in that a monitoring function is provided which records messages in the control device (C), a corresponding defined operating status being the prerequisite for each message and it being possible for each message to trigger a routine of control device, and which compares the operating status that is the prerequisite for the message with the actual current operating status of the cryptographic device, and if the statuses differ causes the cryptographic device to assume an error status, and displays the error via the display means (A).

4. A cryptographic device as claimed in claim 3, characterized in that assigned to the message is a data word which represents the operating status of the cryptographic device that is the prerequisite for the message, and in that there is stored in the status memory (ZS) a further data word which represents the actual current operating status of the cryptographic device, and in that the monitoring device (UA) compares said data words in a monitoring function serving in particular for task tracing.

5. A cryptographic device as claimed in claim 4, characterized in that a monitoring function serving for the function checking of the memories (MA, ZS, MP) assigned to the control device (C) is provided, which monitoring function checks the memories (MA, ZS, MP) by reading out nd re-entering test data words after a "reset" routine has been called.

6. A cryptographic device as claimed in claim 2, characterized in that a monitoring function that checks the program structure of the control device (C) is provided, which monitoring function, when a subroutine is called, compares a code number assigned to the subroutine with a call-up code transferred when the subroutine was called up, and if the codes differ causes the control device to assume an error status, and displays said error on the display means (A).

* * * * *